United States Patent [19]
Yee

[11] Patent Number: 5,084,172
[45] Date of Patent: Jan. 28, 1992

[54] FILTER AND MOUNTING BRACKET

[76] Inventor: Skipper K. Yee, 14 W. Yorkshire Dr., Stockton, Calif. 95207

[21] Appl. No.: 328,978

[22] Filed: Mar. 27, 1989

[51] Int. Cl.$^5$ ............................................. B01D 27/08
[52] U.S. Cl. .................................. 210/249; 210/440; 210/444; 55/493; 55/508
[58] Field of Search ............... 210/249, 440, 443, 444; 55/493, 508

[56] References Cited

U.S. PATENT DOCUMENTS

| | | | |
|---|---|---|---|
| 2,277,737 | 3/1942 | Wilkinson | 210/249 |
| 2,277,738 | 3/1942 | Wilkinson | 210/249 |
| 3,080,061 | 3/1963 | Forsberg | 210/249 |

FOREIGN PATENT DOCUMENTS

| | | | |
|---|---|---|---|
| 599198 | 1/1926 | France | 210/249 |
| 949040 | 4/1949 | France | 210/249 |

*Primary Examiner*—Robert A. Dawson
*Assistant Examiner*—Wanda L. Millard
*Attorney, Agent, or Firm*—Townsend & Townsend

[57] ABSTRACT

A filter and bracket apparatus includes a filter element (8) mounted in a filter container (10) on a base (40). The filter base is supported in one of two operating positions by a bracket (100) which has two extending fingers (102) each having a pair of prongs (108, 110) thereon. The filter base has a pair of extending ears (44) which interact with the bracket's prongs to support the filter alternatively in an upright or an inverted position. The invention also relates to a method for changing an oil filter without disconnecting the fluid conduits delivering fluid to and receiving fluid from the filter.

5 Claims, 3 Drawing Sheets

FILTER AND MOUNTING BRACKET

BACKGROUND OF THE INVENTION

This invention relates generally to fluid filters and devices for mounting and holding such filter. In particular, this invention relates to oil filters mounted in automobiles and other motor vehicles.

As space and size limitations become greater considerations in automotive design, car and truck manufacturers have attempted to fit more and more equipment in smaller and smaller hood areas. As a result, there is very little working space around modern automotive engines. This lack of maneuvering room has turned the simple job of changing an oil filter into a gymnastic feat requiring double-jointed fingers and wrists.

The awkward positioning of many oil filters has spawned the development of specialized tools for operating in the cramped hood space of many cars. These new tools have added to the expense of maintaining motor vehicles. What is needed, therefore, is an oil filter design that meets the space limitations of modern automobiles while allowing for easy replacement without the use of specialized tools.

SUMMARY OF THE INVENTION

This invention meets these and other needs by providing an oil filter and bracket that allows the filter to be moved into an accessible position before changing the filter. In the preferred embodiment of my invention, the filter is a rolled paper filter mounted about a cardboard tube within a filter container. The filter is mounted on a filter base which has inlet and outlet connections. The base is mounted on a bracket having two sets of prongs extending upwardly from a pair of fingers. The filter base has extending ear portions which fit between the prongs to support the filter in either an upright or an inverted position. The filter inlet and outlet are connected to the fluid source and drain, respectively, by flexible hoses or tubes. The filter and base may be turned from an inverted position where they are suspended from the bracket to an upright position where they are seated on the bracket so that the filter may be more easily removed for replacing.

DETAILED DESCRIPTION OF THE PREFERRED EMBODIMENT

Figure 1:
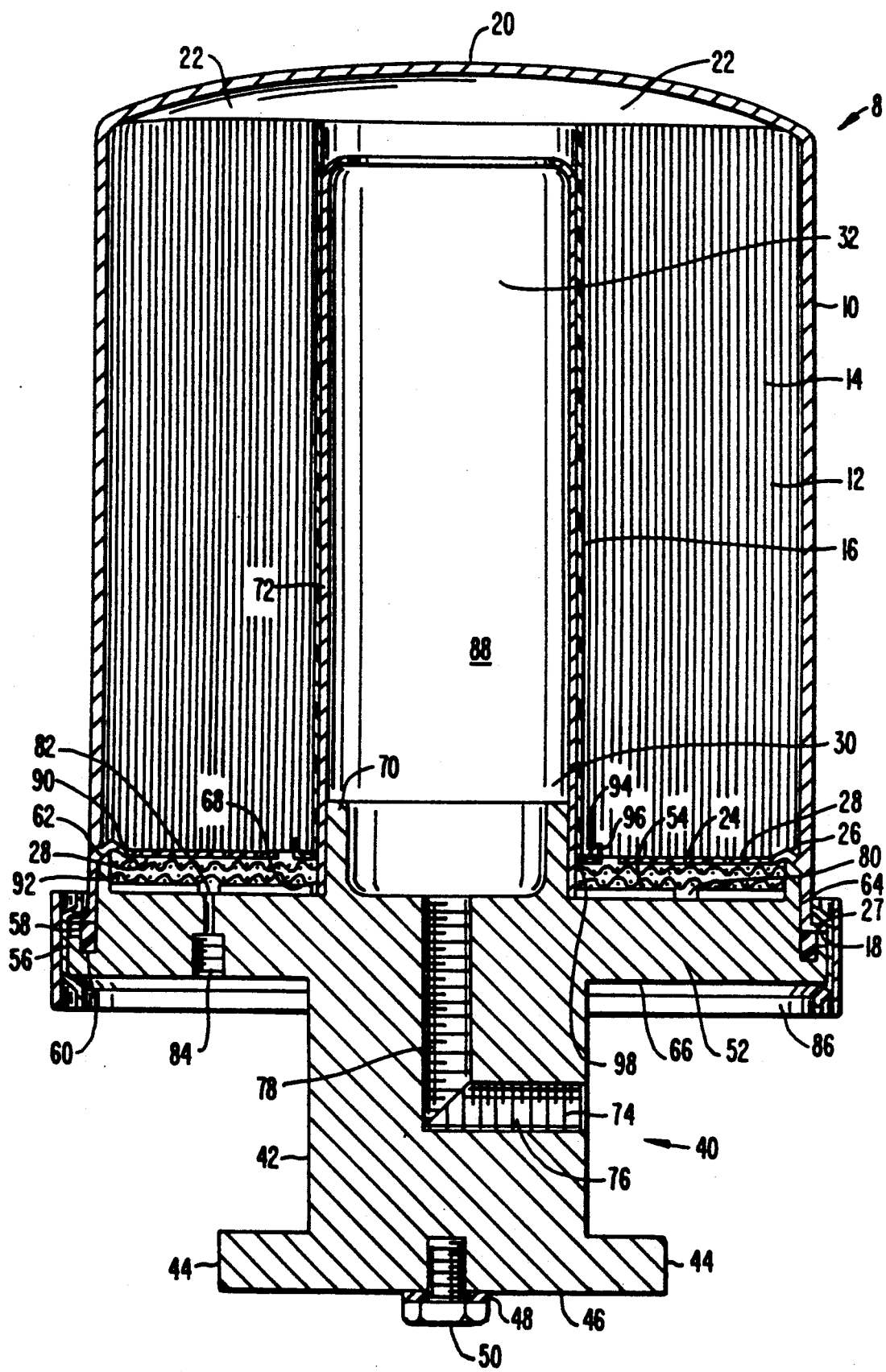
FIG. 1 shows an exploded view of the filter unit and base according to the preferred embodiment.
Figure 2:
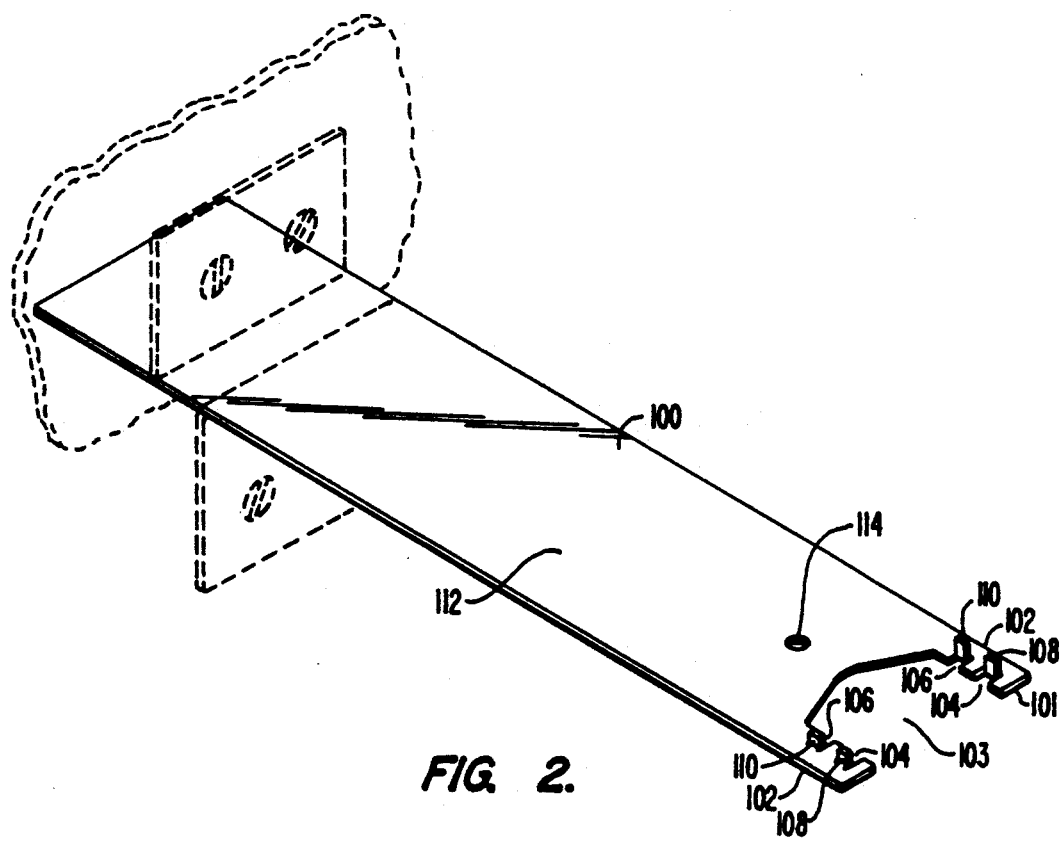
FIG. 2 shows the bracket of the preferred embodiment.

FIG. 1 shows a filter unit 8 and base 40. A sealed cylindrical filter container 10 encloses a filter element 12 formed from rolled tissue paper 14 surrounding a cardboard tube 16. Filter container 10 has an open end 18 and a closed end 20. Formed in closed end 20 are a series of channels 22. Channels 22 permit the flow of fluid through the filter as described below.

In the preferred embodiment, a perforated plate 24 is mounted in open end 18 of filter container 10 below filter element 12. Plate 24 has a ring 26 formed on its outer perimeter extending in a direction away from the filter element. Ring 26 is attached to filter container 10 by crimping the outer edge of the filter container around ring 26. Ring 26 may also be attached by welding or any other suitable means to the open end of the filter container to hold filter element 12 in place. A radially outward extending lip 27 is formed in ring 26 and filter container 10.

Plate 24 has multiple perforations 28 and a large center opening 30 to provide access to the rolled paper 14 and to the center 32 of cardboard tube 16, respectively. The diameter of center opening 30 is larger than the diameter of cardboard tube 16.

Alternatively, perforated plate 24 and ring 26 may be replaced with a removable circular spring element (not shown) made from metal wire. The circular spring element exerts tension against the inside surface of container 10 and holds filter element 12 in place. The circular spring element may be removed to permit replacement of filter element 12 so that filter container 10 may be reused.

In the preferred embodiment, base 40 is formed from die cast aluminum. At the lower end of base 40 is a cylinder 42. Ear portions 44 extend radially from end 46 of cylinder 42. Formed in end 46 of cylinder 42 is a threaded hole 48. Mounted in hole 48 is a screw 50. Screw 50 and ear portions 44 mate with a bracket as explained below.

A plate 52 extends radially from end 54 of cylinder 42. Plate 52 is substantially coaxial with cylinder 42. An upwardly extending ring 56 is formed at the outer periphery of plate 52. A resilient sealing gasket 58 is disposed in a circular groove 60 formed in plate 52 radially inward from ring 56. Gasket 58 interacts with ring 26 and lip 27 of filter unit 8 to seal the filter when assembled.

Another ring 62 is formed on plate 52 radially inward from groove 60 and extends upward from groove 60. The diameter of ring 62 diminishes with the distance from groove 60 such that face 64 of ring 62 forms on obtuse angle with face 66 of plate 52. Face 64 mates with ring 26 of filter unit 8 to seal the filter when assembled.

Face 68 of plate 52 extends radially inward from ring 62. Another upwardly extending ring 70 is formed on face 68 radially inward from ring 62. Mounted on ring 70 is a support tube 72. In the preferred embodiment, support tube 72 is attached to ring 70 by force-fitting. Support tube 72 may also be attached to ring 70 by welding, with glue, or by any other suitable means. When the filter unit and base are assembled, cardboard tube 16 surrounds support tube 72, and face 68 is proximate perforated plate 24.

A threaded fluid inlet 74 is formed in cylinder 42. Inlet 74 has a radial portion 76 and an axial portion 78 extending upward from radial portion 76 and through face 68 at a location radially inward from ring 70.

A series of interconnecting channels 80 is formed in face 68. An orifice 82 is formed in one channel 80 and extends downwardly through plate 52. A threaded outlet 84 is formed in surface 66 to meet orifice 82. In the preferred embodiment, orifice 82 has a diameter of 1/16 inch.

Two mesh or screen rings 90 and 92 are disposed on and substantially cover face 68. The purpose of mesh rings 90 and 92 is to allow fluid to flow from perforated plate 24 into channels 80 and orifice 82. A cup ring 94 is disposed about support tube 72 to hold mesh rings 90 and 92 against face 68. Cup ring 94 has a wall 96 extending upward from its outer periphery at a substantially 90 degree angle and a wall 98 extending upward from its inner periphery at an obtuse angle. Cup ring 94 is force-fit onto support tube 72 to hold mesh rings 90 and 92 in place.

To assemble, filter unit 8 is mounted on base 40 so that cardboard tube 16 surrounds support tube 72, ring 26 surrounds ring 62, and lip 27 rests on gasket 58. Perforated plate 24 rests against mesh rings 90 and 92. Wall 98 of cup ring 94 extends into filter element 12 to prevent filtered fluid from mixing with unfiltered fluid. A clamp 86 surrounds lip 27, gasket 58 and ring 56 to hold filter unit 8 in place on base 40.

In operation, unfiltered oil is introduced into inlet 74 and flows through radial and axial portions 76 and 78 into a space 88 within tube 72. The oil then flows through channels 22 into rolled paper 14 where it is filtered. The filtered oil flows through perforations 28 and mesh rings 90 and 92 into channels 80, then through orifice 82 and outlet 84.

As shown in FIGS. 2 through 5, base 40 may be removably mounted to a bracket 100 which supports the filter in the automobile engine area. In the preferred embodiment, bracket 100 is formed from a strip of carbon steel. A five-sided geometrically shaped material is removed from one end 101 of the strip leaving two fingers 102 extending from end 101. Fingers 102 cooperate with bracket 100 to form a space 103.

Two sets of notches 104 and 106 are formed in fingers 102 by bending rectangular pairs of prongs 108 and 110 upward from fingers 102 at a substantially 90 degree angle to the top surface 112 of the bracket. The distance between adjacent prongs is slightly greater than the width of ear portions 44 of filter base 40.

Figure 3:
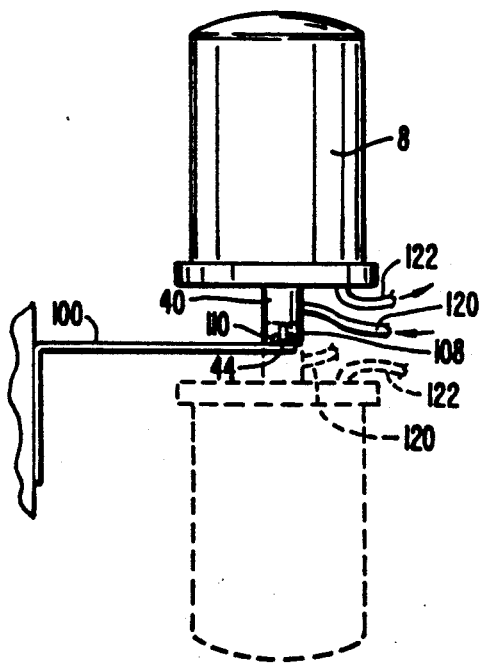
FIG. 3 shows two alternative mounting positions of the filter unit and base of the preferred embodiment.

As shown in FIG. 3, base 40 may be mounted on bracket 100 in two alternative positions. Base 40 may be mounted such that all of base 40 and filter unit 8 extend upward from surface 112. In this upright position, ear portions 44 rest between and are laterally supported by prongs 108 and 110. Alternatively, base 40 may be mounted such that a portion of base 40 and all of filter unit 8 extend downward from surface 112. In this inverted position, ear portions 44 rest between prongs 108 and 110. Filter unit 8 and base 40 are suspended between fingers 102, and a portion of base 40 extends through the space 103 between fingers 102. An optional clasp or securing device (not shown) may be added to keep ear portions 44 in place between prongs 108 and 110 in the inverted position.

Alternatively, base 40 may be attached to bracket 100 by inserting screw 50 through a hole 114 formed in bracket 100 adjacent space 103 and into threaded hole 48 of base 40. Base 40 may be attached to bracket 100 in this manner in either the upright or the inverted positions.

FIGS. 4 and 5 show two ways to mount the assembled filter, base and bracket in an automobile. For either mounting method, bracket 100 may be attached to the engine area of the vehicle by bolting, welding or any other suitable means. The bracket may be bent to fit the contour of the mounting surface. Also for either mounting method, the filter mounting area of the bracket should be bent to make surface 112 generally horizontal. Inlet 74 and outlet 84 are connected to the engine oil system by flexible hoses 120 and 122, respectively, with threaded connections.

Figure 4A:
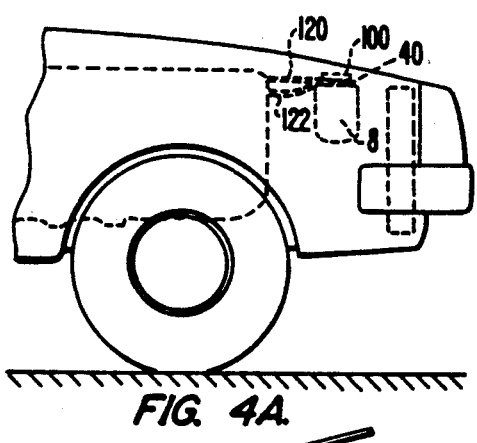
FIGS. 4A, 4B, and 4C show side views of three alternative mounting positions of the preferred filter unit, base and bracket within an automobile.
Figure 5A:
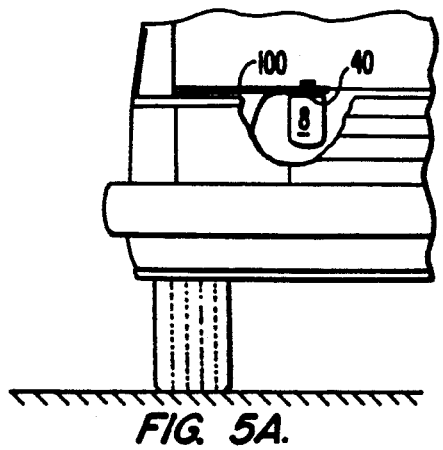
FIGS. 5A, 5B, and 5C show front views of three alternative mounting positions of the preferred filter unit, base and bracket within an automobile.
Figure 4B:
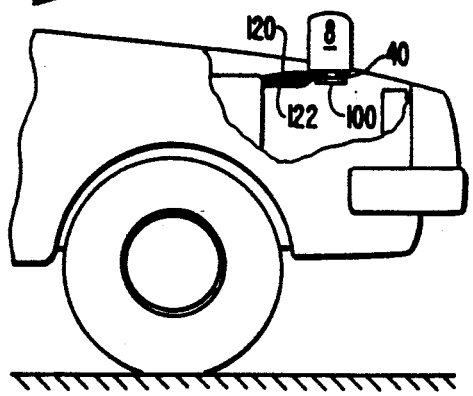
Figure 5B:
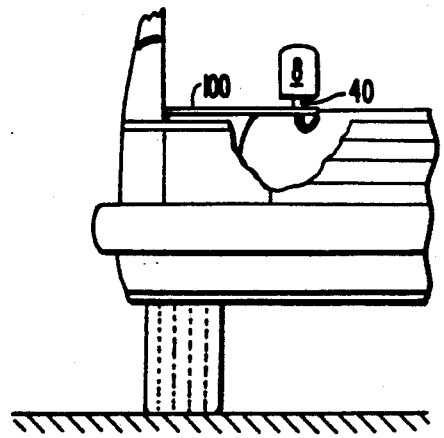

In the first mounting method, bracket 100 is placed so that filter unit 8 and base 40 may be suspended within the engine space with the automobile hood closed as shown in FIGS. 4A and 5A. To replace a used filter, filter unit 8 and base 40 are removed from their suspended position on bracket 100, rotated 180 degrees and placed on top of bracket 100 as shown in FIGS. 4B and 5B. Flexible hoses 120 and 122 must be long enough to permit this movement. Ear portions 44 are placed between bracket prongs 108 and 110 to support base 40 during the replacement operation.

The used filter unit may be detached from base 40 by removing clamp ring 86. A new filter may then be mounted on the base. After tightening the clamp, the new filter unit 8 and base 40 is once again suspended from bracket 100 by rotating the base 180 degrees to the underside of bracket 100 and placing the ear portions 44 between bracket prongs 108 and 110 as shown.

Figure 4C:
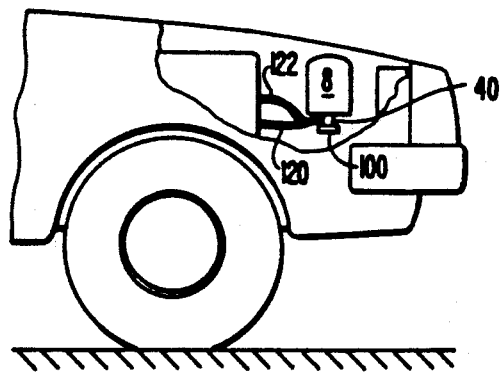
Figure 5C:
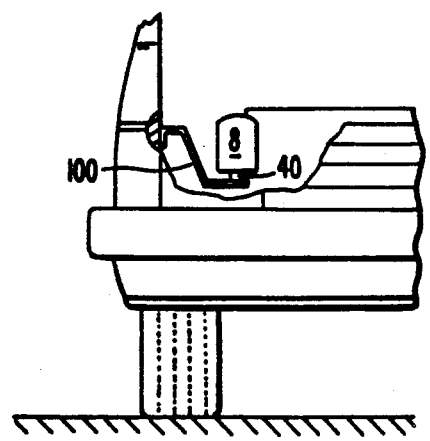

The alternative mounting means is shown in FIGS. 4C and 5C. Bracket 100 be mounted such that filter unit 8 and base 40 (1) are upright within the engine space and (2) do not prevent the automobile hood from closing. Base 40 is secured to bracket 100 by inserting screw 50 through hole 114 into threaded hole 48.

The filter and bracket design of my invention permits the placement of the filter in a location in the engine area during operation of the vehicle which would be inaccessible for the purpose of changing the filter. The filter changing position, on the other hand, may be one in which the upright filter container prevents the engine hood from closing, as shown in FIGS. 4B and 5B. This design makes maximum use of the limited space in the engine area. In addition, since my design permits the filter to be moved away from other engine parts which might limit access to the filter, no special tools are required to remove the filter. Finally, the design permits two different mounting methods for maximum flexibility.

While the bracket according to the preferred embodiment is formed from carbon steel, any suitable material may be used. In addition, many different filter designs may be used along with the bracket of my invention. The description of the preferred embodiment is not intended to limit the scope of the claims.

I claim:

1. A fluid filter apparatus operable in upright and inverted positions, said apparatus comprising:
   a bracket having means for removably supporting a filter container including,
      a finger extending from the bracket;
      a first support member on the finger; and
      a second support member on the finger, the first and second support members defining a gap therebetween; and
   a filter container mounted on a base having a central axis including,
      a protrusion extending from the base along the central axis into the gap and interacting with the first and second support members to support the filter on the bracket in a first position and in a second position, said first position being an upright position in which said central axis of the filter is vertical, said second position being an inverted position in which the filter is rotated 180 degrees from said first position about an axis perpendicular to the central axis of the filter.

2. The apparatus of claim 1 wherein the means for removably supporting further comprises a second finger, the base having a second protrusion to interact with said second finger to support the filter in one of said first and second positions.

3. The apparatus of claim 2 wherein the bracket further comprises second means for removably supporting the filter thereon.

4. The apparatus of claim 1 wherein the base has an inlet for admitting fluid to the filter.

5. The apparatus of claim 1 wherein the base has an outlet for discharging fluid from the filter.

* * * * *